United States Patent
Ikeda et al.

(10) Patent No.: US 10,508,718 B2
(45) Date of Patent: Dec. 17, 2019

(54) INTERNAL COMBUSTION ENGINE

(71) Applicant: HONDA MOTOR CO., LTD., Tokyo (JP)

(72) Inventors: Tsugio Ikeda, Wako (JP); Shigeyuki Hara, Wako (JP); Masaji Narushima, Wako (JP); Koichi Tsutsumi, Wako (JP); Hiroto Takeichi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 202 days.

(21) Appl. No.: 15/704,953

(22) Filed: Sep. 14, 2017

(65) Prior Publication Data

US 2018/0094708 A1    Apr. 5, 2018

(30) Foreign Application Priority Data

Sep. 30, 2016   (JP) .................................. 2016-193042

(51) Int. Cl.
*F16H 7/08*    (2006.01)
*F01L 1/02*    (2006.01)
(Continued)

(52) U.S. Cl.
CPC ................ *F16H 7/08* (2013.01); *F01L 1/022* (2013.01); *F01L 1/026* (2013.01); *F01L 1/047* (2013.01); *F02F 7/0043* (2013.01); *F16H 7/06* (2013.01); *F16H 7/18* (2013.01); *F01L 2001/0475* (2013.01); *F01L 2001/0476* (2013.01); *F01L 2001/0537* (2013.01); *F01L 2101/00* (2013.01); *F01L 2810/03* (2013.01);
(Continued)

(58) Field of Classification Search
CPC ...... F16H 7/18; F16H 7/08; F16H 2007/0872; F16H 2007/0804; F01L 1/022
USPC .................................................. 474/140, 144
See application file for complete search history.

(56) References Cited

U.S. PATENT DOCUMENTS 2,342,091 A * 2/1944 Schroeder ................ B66D 3/26
                                                              254/372
2,718,153 A * 9/1955 Dean ......................... F16H 7/06
                                                              198/837

(Continued)

FOREIGN PATENT DOCUMENTS

JP    61-41947 U    3/1986
JP    62-46851 U    3/1987

(Continued)

OTHER PUBLICATIONS

Australian Office Action dated Nov. 14, 2018, for Australian Patent Application No. 2017213526.

*Primary Examiner* — Henry Y Liu
(74) *Attorney, Agent, or Firm* — Birch, Stewart, Kolasch & Birch, LLP

(57) ABSTRACT

In an internal combustion engine including a driving-sprocket cam chain guide 70 for guiding a cam chain 47 along a driving sprocket 45, as viewed in a crankshaft axial direction, a guide body 71 of the driving-sprocket cam chain guide 70 extends beyond a winding termination point P of the cam chain 47 on the driving sprocket 45 to a position adjacent to a chain moving surface 51c of a cam chain tensioner 51, on which the cam chain 47 slides. The engine provides a cam-chain dropout preventing function to the cam chain guide, thus reducing load on the cam chain tensioner and improving durability of the tensioner lifter.

8 Claims, 7 Drawing Sheets

(51) Int. Cl.
*F01L 1/047* (2006.01)
*F02F 7/00* (2006.01)
*F16H 7/06* (2006.01)
*F16H 7/18* (2006.01)
*F01L 1/053* (2006.01)

(52) U.S. Cl.
CPC ............... *F16H 2007/0842* (2013.01); *F16H 2007/0872* (2013.01); *F16H 2007/0893* (2013.01); *F16H 2007/0897* (2013.01); *F16H 2007/185* (2013.01)

(56) References Cited

U.S. PATENT DOCUMENTS

| | | | | | |
|---|---|---|---|---|---|
| 3,266,078 | A * | 8/1966 | Brown | ....................... | A47L 5/30 |
| | | | | | 15/319 |
| 3,656,361 | A * | 4/1972 | Honda | ..................... | F16H 7/06 |
| | | | | | 474/140 |
| 3,885,471 | A * | 5/1975 | Morine | ..................... | F16P 1/02 |
| | | | | | 474/144 |
| 4,869,708 | A * | 9/1989 | Hoffmann | ................ | F01L 1/02 |
| | | | | | 474/140 |
| 5,580,325 | A * | 12/1996 | Hirota | ................... | F02B 77/081 |
| | | | | | 474/144 |
| 5,665,019 | A * | 9/1997 | Sheffer | .................... | F16H 7/08 |
| | | | | | 474/111 |
| 5,702,318 | A * | 12/1997 | Hayafune | ............... | F02B 67/06 |
| | | | | | 474/111 |
| 5,758,484 | A * | 6/1998 | Ledvina | ................. | F16G 13/04 |
| | | | | | 474/206 |
| 6,030,306 | A * | 2/2000 | Young | ..................... | F01L 1/02 |
| | | | | | 474/111 |
| 6,250,268 | B1 * | 6/2001 | Iwase | ....................... | F01L 1/02 |
| | | | | | 123/90.31 |
| 6,336,881 | B1 * | 1/2002 | Rapp | ........................ | F01L 1/02 |
| | | | | | 474/111 |
| 6,364,797 | B1 * | 4/2002 | Ikusue | .................... | B62M 7/02 |
| | | | | | 180/230 |
| 6,510,828 | B2 * | 1/2003 | Ito | .......................... | F01L 1/022 |
| | | | | | 123/195 R |
| 6,620,067 | B1 * | 9/2003 | Nakamura | .............. | F01L 1/024 |
| | | | | | 474/111 |
| 6,808,467 | B2 * | 10/2004 | Takeda | ..................... | F16H 7/08 |
| | | | | | 474/111 |
| 7,513,843 | B2 * | 4/2009 | Markley | ............... | F16H 7/0848 |
| | | | | | 474/111 |
| 7,513,844 | B2 * | 4/2009 | Matsushita | ........... | F16H 7/0836 |
| | | | | | 474/109 |
| 7,628,719 | B2 * | 12/2009 | Markley | ............... | F16H 7/0848 |
| | | | | | 474/111 |
| 7,632,200 | B2 * | 12/2009 | Markley | ............... | F16H 7/0848 |
| | | | | | 474/109 |
| 7,874,949 | B2 * | 1/2011 | Tawarada | .................. | F16H 7/18 |
| | | | | | 123/196 R |
| 7,946,939 | B2 * | 5/2011 | Hirata | ...................... | F01L 1/02 |
| | | | | | 474/140 |
| 7,951,029 | B2 * | 5/2011 | Oota | ........................ | F16H 7/18 |
| | | | | | 474/111 |
| 8,454,462 | B2 * | 6/2013 | Konno | ..................... | F16H 7/08 |
| | | | | | 474/111 |
| 8,465,385 | B2 * | 6/2013 | Konno | ..................... | F16H 7/08 |
| | | | | | 474/101 |
| 8,579,746 | B2 * | 11/2013 | Mori | ........................ | F16H 7/06 |
| | | | | | 474/140 |
| 8,668,608 | B2 * | 3/2014 | Lee | ........................... | F16H 7/18 |
| | | | | | 474/111 |
| 8,900,079 | B2 * | 12/2014 | Mori | ........................ | F16H 7/18 |
| | | | | | 474/111 |
| 8,920,272 | B2 * | 12/2014 | Tokita | ..................... | F16G 13/04 |
| | | | | | 474/140 |
| 9,469,375 | B2 * | 10/2016 | Nakano | .................... | B62M 9/06 |
| 9,657,613 | B2 * | 5/2017 | Aoyagi | .................... | F02F 7/006 |
| 2011/0183797 | A1 * | 7/2011 | Konno | ...................... | F16H 7/08 |
| | | | | | 474/111 |
| 2015/0122210 | A1 * | 5/2015 | Aoyagi | .................... | F02F 7/006 |
| | | | | | 123/90.34 |

FOREIGN PATENT DOCUMENTS

| | | |
|---|---|---|
| JP | 6-280608 A | 10/1994 |
| JP | 10-246297 A | 9/1998 |
| JP | 2002-89636 A | 3/2002 |
| JP | 2004-245385 A | 9/2004 |
| JP | 2004-278354 A | 10/2004 |
| JP | 4059318 B2 | 3/2008 |

* cited by examiner

INTERNAL COMBUSTION ENGINE

TECHNICAL FIELD

The present invention relates to an internal combustion engine equipped with a cam chain guide.

BACKGROUND ART

Some of the conventional internal combustion engines are provided with a cam-chain dropout preventing member in addition to a cam chain tensioner for control of behaviors, such as vibrations, of a cam chain which transfers power from a crankshaft to a camshaft. The cam-chain dropout preventing member prevents the cam chain from dropping out and falling in the internal combustion engine during maintenance work or the like of the engine.

An object of the invention is to reduce load on the cam chain tensioner and to further improve durability of a tensioner lifter by imparting a cam chain guiding function to control the behaviors of the cam chain to the cam-chain dropout preventing member to prevent such a dropout of the cam chain.

PRIOR ART DOCUMENTS

Patent Document

[Patent Document 1] JP 4059318 B
[Patent Document 2] JP 2004-278354 A

SUMMARY OF INVENTION

Technical Problem

The invention has been made to overcome the above-mentioned problem. An object of the invention is to provide an internal combustion engine which is adapted to reduce load on the cam chain tensioner and to further improve durability of the tensioner lifter by imparting, to the cam-chain dropout preventing member, the function of the cam chain guide for controlling the behaviors of the cam chain.

Solution to Problem

According to the present invention, there is, provided an internal combustion engine comprising: a driving sprocket integrally rotatable with a crankshaft; a driven sprocket integrally rotatable with a camshaft driving a valve train; a cam chain wound between the driving sprocket and the driven sprocket and transferring power of the crankshaft to the camshaft; a cam chain tensioner for pressing the cam chain at a position between the driving sprocket and the driven sprocket; a tensioner lifter for pressing the cam chain tensioner with a predetermined pressure; and a driving-sprocket cam chain guide for guiding the cam chain along the driving sprocket; wherein, as viewed in a crankshaft axial direction, the driving-sprocket cam chain guide includes a guide body extending beyond a winding termination point of the cam chain on the driving sprocket to a position adjoining a chain moving surface of the cam chain tensioner, on which the cam chain slides.

According to the above-described arrangement of the invention, the guide body of the driving-sprocket cam chain guide extends, as viewed in the crankshaft axial direction, beyond the winding termination point of the cam chain on the driving sprocket to a position adjacent to the chain moving surface of the cam chain tensioner, on which the cam chain slides. Thus, a function of the cam-chain dropout preventing member and a function of the cam chain guide for controlling the behaviors of the cam chain are imparted to the driving-sprocket cam chain guide. The driving-sprocket cam chain guide is adapted to control the behaviors, such as vibrations, of the cam chain by preventing an outward deflection of the cam chain. Further, the load on the cam chain tensioner for controlling the cam chain is reduced so that the tensioner lifter is improved in durability.

The above-described arrangement may also be such that the internal combustion engine includes a crankcase for bearing the crankshaft, the crankcase includes a cam-chain tensioner support portion for swingably supporting the cam chain tensioner, the crankcase includes a driving-sprocket cam chain guide fixing portion which is independent from the cam-chain tensioner support portion and fixes the driving-sprocket cam chain guide, and the cam-chain tensioner support portion is located nearer to the camshaft than a camshaft side end of the driving sprocket.

According to the above-described arrangement, the crankcase includes: the cam-chain tensioner support portion for swingably supporting the cam chain tensioner, and the driving-sprocket cam chain guide fixing portion which is independent from the cam-chain tensioner support portion and fixes the driving-sprocket cam chain guide. The cam-chain tensioner support portion is located nearer to the camshaft from the camshaft side end of the driving sprocket. Therefore, the cam chain tensioner can be downsized by shortening the length thereof along the cam chain. Thus, the load on the tensioner lifter can be further reduced, leading to an improvement of durability thereof.

In the above-described arrangement, the driving-sprocket cam chain guide fixing portion is provided adjacent to the cam-chain tensioner support portion in a moving direction of the cam chain.

Because of the above-described arrangement, the driving-sprocket cam chain guide and the cam chain tensioner can be separately assembled, leading to an improvement in assemblability. This arrangement also permits these components to be separately disassembled for maintenance, making these components more easily maintainable. Further, the driving-sprocket cam chain guide fixing portion and the cam-chain tensioner support portion are separately mounted to the crankcase, and hence the load applied to the crankcase from the cam chain is dispersed. The loads on or the strains of the driving-sprocket cam chain guide fixing portion and the cam-chain tensioner support portion can be reduced, respectively.

The above-described arrangement may also be such that the driving-sprocket cam chain guide is made of a synthetic resin while the guide has a J-shaped configuration to guide at least a lower end of the cam chain from below.

Because of the above-described arrangement, the driving-sprocket cam chain guide has its guide surface elongated in the J-shaped configuration and can achieve good moldability and reduction in sliding resistance and friction.

The above-described arrangement may also be such that the driving-sprocket cam chain guide includes an overhang portion which, as viewed in the axial direction of the crankshaft, extends to an end part thereof in a direction making an overhang angle to a line, which is parallel to a line connecting a rotational center of the driving sprocket and a rotational center of the driven sprocket and which is tangent to the winding termination point of the cam chain on the driving sprocket, in such a manner that the cam chain is caused to be directed inward.

Because of the above-described arrangement, the overhang portion provides smooth connection with the chain moving surface of the cam chain tensioner. Further, the cam chain tensioner can be decreased in convex curvature from the cam-chain tensioner fixing portion. Thus, load on the cam chain tensioner can be reduced.

The above-described arrangement may also be such that the internal combustion engine includes a cylinder body and a cylinder head which are sequentially stacked on the crankcase, and that the tensioner lifter is disposed on the cylinder head.

Because of the above-described arrangement, the cam chain tensioner can be elongated toward the camshaft by a shortened amount of a lower part thereof. At the same time, increase in the load on the tensioner lifter can be avoided.

The above-described arrangement may be such that the tensioner lifter includes a pressing member for pressing the cam chain tensioner, in which the pressing member has an axis of a sliding direction, and the axis is inclined upward relative to a mating surface between the cylinder body and the cylinder head.

Because of the above-described arrangement, the cam chain tensioner can be positioned closer to the crankcase, thus obviating increase in size of the internal combustion engine.

The above-described arrangement may be such that the cam chain tensioner has a tensioner-lifter-abutting-side half pressed by the pressing member, and a fixing-portion-side half, the tensioner-lifter-abutting-side half being larger than the fixing-portion-side half.

Because of the above-described arrangement, the behaviors of the cam chain tensioner can be stabilized by shifting the center of gravity of the cam chain tensioner toward a pressed portion for the tensioner lifter.

Advantageous Effects of Invention

According to the invention, the behaviors such as vibrations of the cam chain can be controlled by preventing outward deflection of the cam chain. Furthermore, the tensioner lifter can be improved in durability by reducing the load on the cam chain tensioner for straining the cam chain.

DESCRIPTION OF EMBODIMENT

Figure 1:
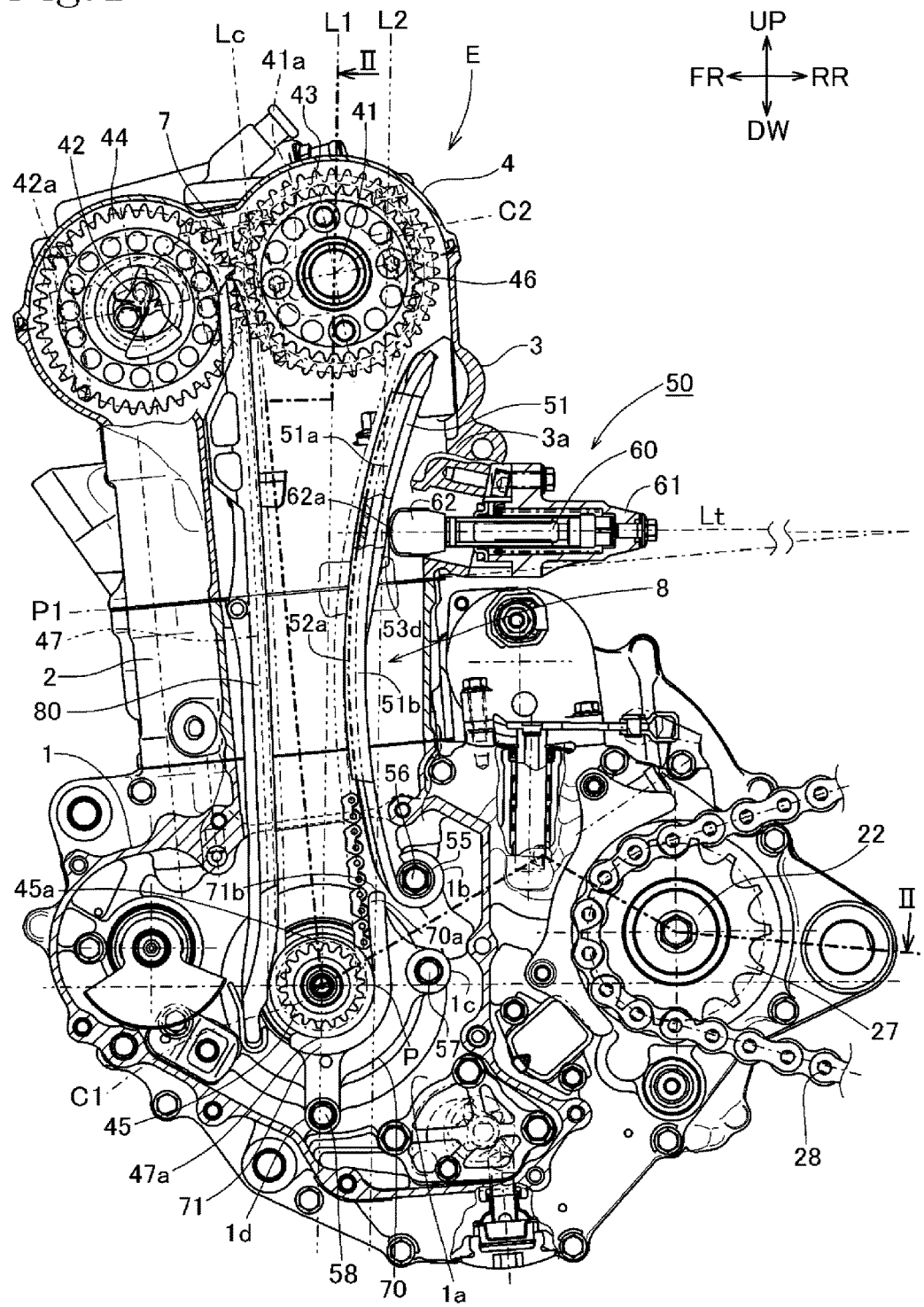
FIG. 1 is a vertical sectional view of an internal combustion engine according to an embodiment of the invention.
Figure 2:
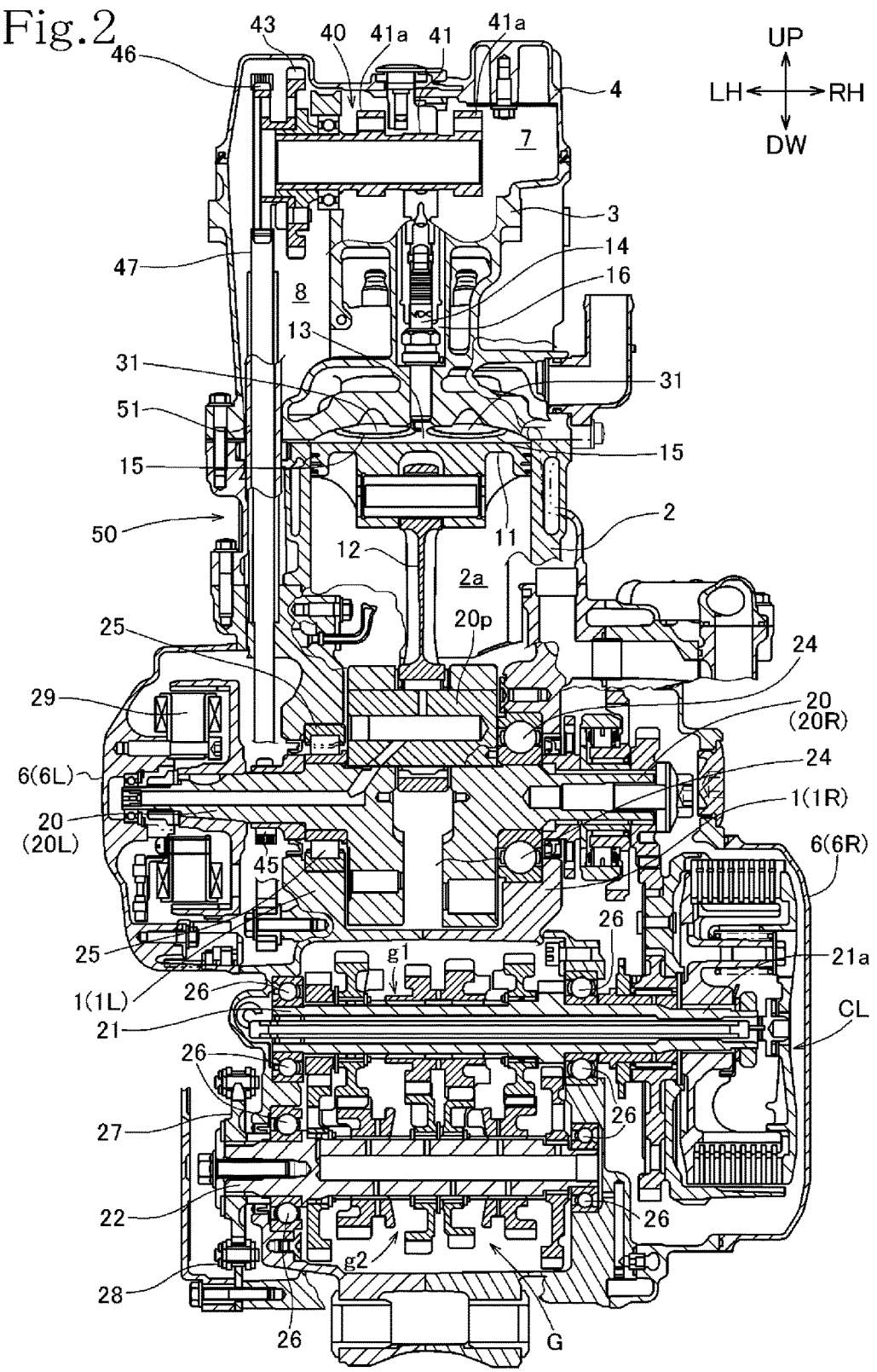
FIG. 2 is a developed sectional view of the internal combustion engine taken along the arrowed line II in FIG. 1.
Figure 3:
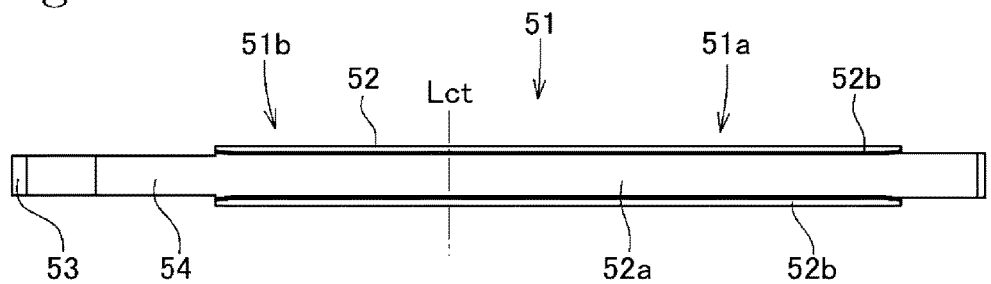
FIG. 3 is a plan view of a cam chain tensioner.

An internal combustion engine E according to an embodiment of the invention will be described below with reference to FIG. 1 to FIG. 10. FIG. 1 is a vertical sectional view of the internal combustion engine E. FIG. 2 is a developed sectional view across respective axial centerlines of a crankshaft 20, a main shaft 21 and a counter shaft 22 of the internal combustion engine E according to the embodiment of the invention. The crankshaft 20, main shaft 21 and counter shaft 22 are disposed in a crankcase 1 in a manner that axial directions thereof extend in parallel with each other.

It is to be noted that the front-back and left-right directions defined herein are in accordance with the normal basis where a straight-ahead driving direction of a motorcycle (not shown) equipped with the internal combustion engine E according to the embodiment of the invention is the front direction. In the drawings, FR denotes forward, RR rearward, LH leftward, RH rightward, UP upward and DW downward.

As shown in FIG. 1, the internal combustion engine E has an arrangement in which a cylinder body 2 and a cylinder head 3 are sequentially stacked on the crankcase 1 and are integrally fastened together by means of stud bolts not shown. An upper part, of the cylinder head 3 is covered with a cylinder head cover 4. A cylinder axis line Lc as the center axis of a cylinder bore 2a of the cylinder body 2 is slightly inclined forward from the vertical line. A portion under the crankcase 1 defines an oil reservoir.

As shown in FIG. 2, the crankcase 1 includes a pair of left-hand crankcase section 1L and right-hand crankcase section 1R. Lateral sides of the crankcase 1 are covered with case covers 6. The case covers 6 include a pair of left-hand case cover 6L and right-hand case cover 6R which cover the left-hand and right-hand crankcase sections 1L and 1R, respectively, on the lateral sides thereof.

The cylinder body 2 includes a piston 11 vertically slidably fitted in the cylinder bore 2a vertically extending in the cylinder body 2. A crankpin 20p of the crankshaft 20 is connected to the piston 11 via a connecting rod 12. A spark plug 14 inserted into a ceiling wall of the cylinder head 3 has a tip electrode exposed in a combustion chamber 13 defined between the top surface of the piston 11 and a ceiling surface of the cylinder head 3. The crankshaft 20 includes a left-hand shaft portion 20L and a right-hand shaft portion 20R.

In the crankcase 1, the crankshaft 20 is rotatably supported by the left-hand and right-hand crankcase sections 1L and 1R via a pair of left-hand and right-hand rolling bearings 24 and 25. The main shaft 21 and the counter shaft 22 are rotatably supported by the left-hand and right-hand crankcases sections 1L and 1R via a pair of bearings 26 and 26, respectively. In the crankcase 1, the main shaft 21 and the counter shaft 22 are in parallel with the crankshaft 20 and each rotatably supported via the left-hand and right-hand bearings 26 and 26.

Combustion energy in the combustion chamber 13 of the internal combustion engine E is converted into a kinetic energy for the piston 11. The piston 11 is vertically moved by this kinetic energy so as to rotatably drive the crankshaft 20 via the connecting rod 12.

The left-hand shaft portion 20L extending leftward from the rolling bearing 24 on the crankshaft 20 is provided with a driving sprocket 45 and an AC generator 29 in this order from the rolling bearing 24 to the left side.

As shown in FIG. 2, a switchable clutch device CL is mounted to a right end 21a of the main shaft 21. A rotary drive force of the crankshaft 20 is transmitted to the main shaft 21 via the clutch device CL and then, to the counter shaft 22 via a transmission M.

The transmission M includes: a transmission gear group G including a group of main gears g1 mounted to the main shaft 21 and a group of counter gears g2 mounted to the counter shaft 22; and a gear change mechanism (not shown) operated by a gear shift device and including a shift drum (not shown) and a shift fork (not shown).

A drive chain 28 is wound between a drive gear 27 integrally rotatable with the counter shaft 22 and a driven gear (not shown) integrally rotatable with an axle of a rear wheel (not shown) so that a power of the crankshaft 20 is transmitted to the rear wheel.

The cylinder head 3 includes: an intake valve port (not shown) and an exhaust valve port 15 which are open in an upper wall surface of the combustion chamber 13; and a spark plug hole 16 for insertion of the spark plug 14 which opens near the intermediate point between the intake valve port and the exhaust valve port 15. The intake valve port is provided with an intake valve for opening/closing the intake valve port, while the exhaust valve port 15 is provided with an exhaust valve 31 for opening/closing the exhaust valve port 15. The intake valve and the exhaust valve 31 are constantly urged to open by a coil-shaped valve spring not shown.

As shown in FIG. 2, a valve train 40 for operating the intake valve and the exhaust valve 31 is disposed in a valve chamber 7 defined by the cylinder head 3 and the cylinder head cover 4. The valve train 40 is of DOHC system and includes, as shown in FIG. 1, an intake camshaft 41 provided with an intake cam 41a, and an exhaust camshaft 42 provided with an exhaust cam 42a. The intake camshaft 41 and the exhaust camshaft 42 are rotatably supported at places between the cylinder head 3 and the cylinder head cover 4.

The intake cam 41a is held in contact against an axial end of the intake valve via an unillustrated rocker arm. In conjunction with the revolution of the intake camshaft 41, the intake cam 41a presses the axial end of the intake valve so as to open or close the intake valve. The exhaust cam 42a is held in contact against an axial end of the exhaust valve 31 via an unillustrated rocker arm. In conjunction with the revolution of the exhaust camshaft 42, the exhaust cam 42a presses the axial end of the exhaust valve 31 so as to open or close the exhaust valve 31.

As shown in FIG. 2, a cam chain chamber 8 is configured on the left side of the engine E in a manner to extend in the crankcase 1, the case cover 6, the cylinder body 2, the cylinder head 3 and the cylinder head cover 4.

The left end of the intake camshaft 41 projects into the cam chain chamber 8. A driven sprocket 46 is fitted on the left end of the intake camshaft 41 so as to be integrally rotated with the intake camshaft. Further, a driving gear 43 is fitted on the intake camshaft 41 at a place inward from the driven sprocket 46. Fitted on the left end of the exhaust camshaft 42 is a driven gear 44 which has the same diameter as that of the driving gear 43 and is meshed with the driving gear 43.

The driving sprocket 45 is coupled to the left-hand shaft portion 20L of the crankshaft 20 so as to be integrally rotated therewith. An endless cam chain 47 for transmitting the power of the crankshaft 20 to the intake camshaft 41 is wound between the driving sprocket 45 and the driven sprocket 46. The crankshaft 20 is driven in rotation in a counterclockwise direction as seen in FIG. 1.

When the crankshaft 20 is rotated, the driving sprocket 45 is driven in rotation, driving in rotation the driven sprocket 46 via the cam chain 47 at half the rotational speed of the crankshaft 20. The intake camshaft 41 with the driven sprocket 46 fitted thereon and the exhaust camshaft 42 driven by the intake camshaft 41 via the driving gear 43 and the driven gear 44 are driven in rotation at the same rotational speed. The intake cam 41a on the intake camshaft 41 and the exhaust cam 42a on the exhaust camshaft 42 drive the intake valve (not shown) and the exhaust valve 31 at predetermined timings, allowing the internal combustion engine E to make intake and exhaust operations.

The tension on the cam chain 47 need be properly maintained at all times in order to operate the intake valve (not shown) and the exhaust valve 31 at the predetermined timings in this manner. In order to prevent free vibrations of the cam chain 47 and to impart a constant tension to the cam chain 47, the internal combustion engine E, as shown in FIG. 1, is provided with a cam chain guide 80 for guiding the cam chain 47, disposed on a tense side of the cam chain 47 between the driving sprocket 45 and the driven sprocket 46; a cam chain tensioner mechanism 50 for pressing the cam chain 47 with a predetermined pressure, disposed on a loose side of the cam chain 47 between the driving sprocket 45 and the driven sprocket 46; and a driving-sprocket cam chain guide 70 for guiding the cam chain 47 along the driving sprocket 45.

A portion of the cam chain 47 that extends between the driving sprocket 45 and the driven sprocket 46 and is constantly strained by the driving sprocket 45, is tense and does not tend to be loosened. The stationary cam chain guide 80 is in contact against the tense side portion of the cam chain 47 so as to guide the tense side cam chain substantially spanning the entire length between the driven sprocket 46 and driving sprocket 45. The cam chain guide 80 is formed with a recess (not shown) on its surface in contact against the cam chain 47. The recess is substantially as wide as the cam chain 47 so as to ensure that the cam chain 47 is reliably guided between the driven sprocket 46 and the driving sprocket 45.

A portion of the cam chain 47 that extends between the driving sprocket 45 and the driven sprocket 46 and is constantly delivered by the driving sprocket 45 is loosened and unstable in behavior. Therefore, the cam chain tensioner mechanism 50 is provided which applies a constant tension to the cam chain 47 at all times by swingingly pressing the cam chain 47 in accordance with the behavior of the cam chain 47. The cam chain tensioner mechanism 50 includes: a cam chain tensioner 51 which presses the moving cam chain 47 so as to slidingly guide the cam chain 47; and a tensioner lifter 60 which presses the cam chain tensioner 51 with a predetermined pressure.

As shown in FIG. 3 to FIG. 7, the cam chain tensioner 51 includes: a guide shoe member 52 for slidingly guiding the moving cam chain 47; and a base member 53 which supports the guide shoe member 52 in the moving direction of the cam chain 47. The base member 53 is integrally assembled with the guide shoe member 52.

In order to restrain the loose side of the cam chain 47, the guide shoe member 52 has a width slightly greater than that of the cam chain 47 and a length to extend from the driving sprocket 45 to the vicinity of the driven sprocket 46, and is so curved as to conform to the cam chain 47. A sliding guide member 54 for slidably guiding the cam chain 47 is attached to the guide shoe member 52 on its side facing the cam chain 47, thus defining a chain moving surface 52a.

The chain moving surface 52a is formed with dropout preventing side edges 52b on longitudinal opposite sides thereof. The dropout preventing side edge 52b projects from the chain moving surface 52a toward the cam chain 47 so as to prevent the dropout of the cam chain 47. A base-member fitting recess 52c for fitting engagement with the base member 53 is formed on the opposite side of the guide shoe member 52 from the chain moving surface 52a.

Figure 7:
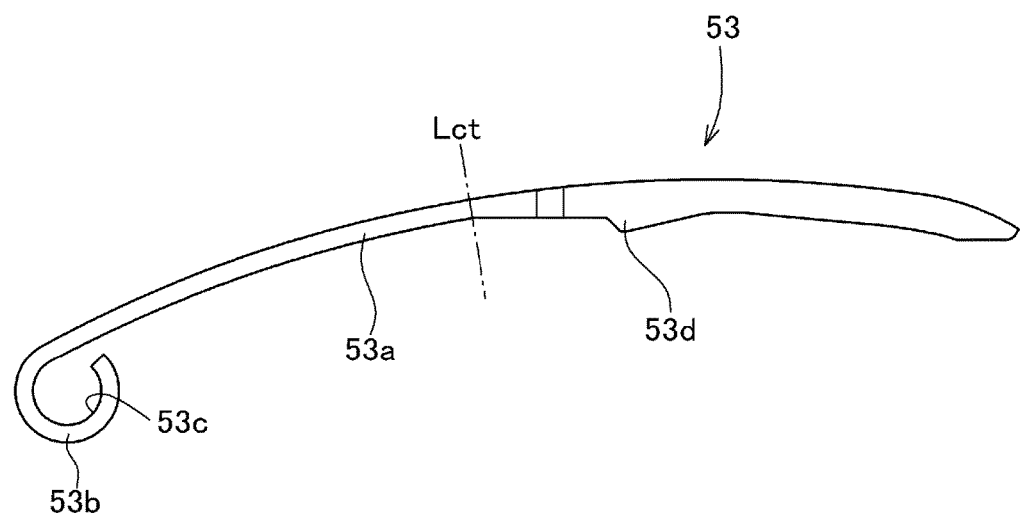
FIG. 7 is a side view of a base member.

The base member 53 is so curved as to conform to the guide shoe member 52, as shown in FIG. 7. The base member is formed with: a shoe support portion 53a for supporting the guide shoe member 52; and a fixing portion 53b located at its end on the side of the driving sprocket 45 (at a lower end thereof in this embodiment as seen in FIG. 1). The fixing portion 53b is formed in a substantially cylindrical shape and positioned on the outer side relative to the cam chain 47. The fixing portion 53b is centrally formed with a collar fitting hole 53c in which a collar 55 is fitted. The collar 55 is formed of a metal such as iron and inserted through the hole 53c.

The base member 53 is formed with an abutment portion 53d on an outer side thereof facing the cam chain 47. The abutment portion 53d is pressed by the tensioner lifter 60 which is brought into contact thereagainst. As shown in FIG. 1, the abutment portion 53d is contacted by the distal end of a plunger 62 as a pressing member of the tensioner lifter 60 to be described hereinlater.

Figure 4:
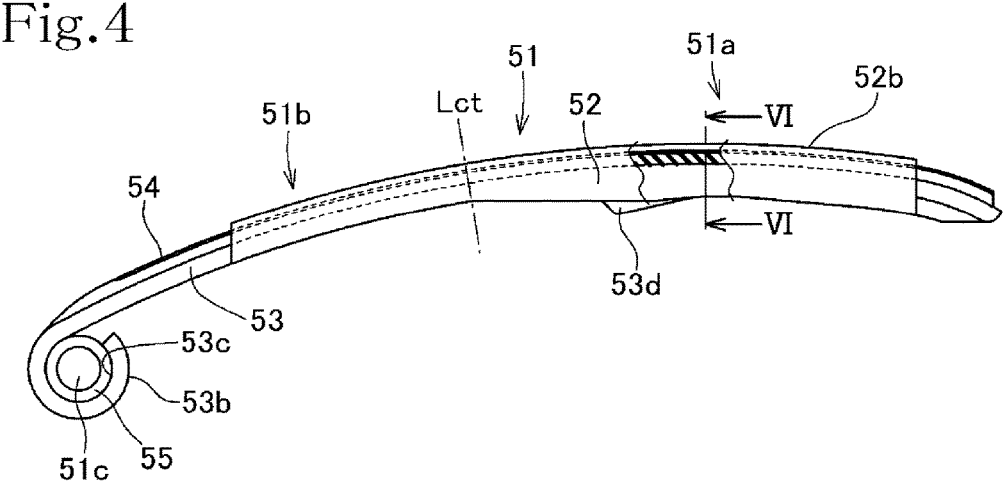
FIG. 4 is a side view of the cam chain tensioner.
Figure 5:
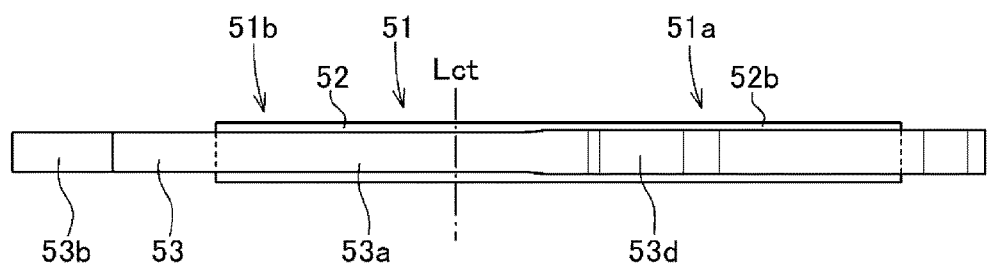
FIG. 5 is a rear view of the cam chain tensioner.
Figure 6:
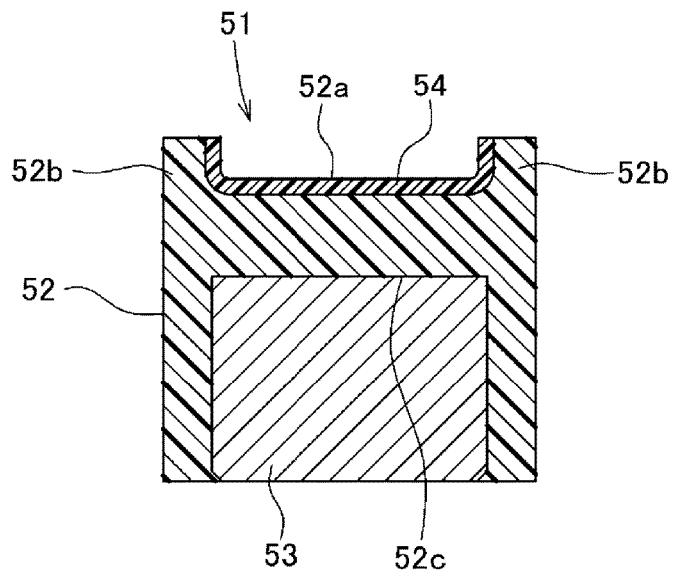
FIG. 6 is a sectional view taken on the line VI-VI in FIG. 4.

As shown in FIG. 4, in the longitudinal direction starting from the fixing portion 53b, the cam chain tensioner 51 is progressively increased in thickness from a longitudinally intermediate part thereof to a maximum thickness due to protrusion in the abutment portion 53d and then is slightly decreased. The slightly decreased thickness of the cam chain tensioner is however greater than the thickness of the fixing portion 53b.

When the cam chain tensioner 51 is divided into halves by a longitudinally intermediate line Lct, the tensioner lifter abutting-side half 51a, where the abutment portion 53d is contacted by the tensioner lifter 60, is enlarged to have greater thickness and weight than the fixing-portion-side half 51b where the fixing portion 53b is provided. The cam chain tensioner 51 is thus increased in rigidity due to the increased thickness of the base member 53 in its portion from the abutment portion 53d to the distal end thereof. Further, the cam chain tensioner 51 is improved in stability of its behavior by shifting the center of gravity of the cam chain tensioner 51 toward the tensioner lifter 60.

As shown in FIGS. 1 and 2, a side wall 1a of the left-hand crankcase 1L is formed with a cam-chain tensioner support portion 1b for supporting the cam chain tensioner 51. The cam-chain tensioner support portion 1b is disposed at a position radially upward and rightward with respect to the crankshaft 20 as viewed in the crankshaft axial direction and in the vicinity of the driving sprocket 45. The cam-chain tensioner support portion 1b is located closer to the intake camshaft 41 than a camshaft side end 45a of the driving sprocket 45 nearest to the intake camshaft 41

A bolt 56 inserted through the collar 55 fitted in the fixing portion 53b of the cam chain tensioner 51 is fastened to the cam-chain tensioner support portion 1b, so that the cam chain tensioner 51 is swingably supported by the crankcase 1.

The tensioner lifter 60 for pressing the cam chain tensioner 51 with a predetermined pressure extends inside a rear wall 3a of the cylinder head 3 so as to be mounted to the cylinder head 3, as shown in FIG. 1.

The tensioner lifter 60 is a screw-type tensioner lifter 60 and includes: a tensioner body 61 as a shell; and the plunger 62 as the pressing member for pressing the cam chain tensioner 51. The plunger 62 moves to slide in the tensioner body 61 in conjunction with the behavior of the cam chain tensioner 51, thus pressing the cam chain tensioner 51 with a predetermined pressure.

As shown in FIG. 1, the tensioner lifter 60 is mounted to the internal combustion engine E in a manner that the distal end portion of the plunger 62 with respect to an axis Lt of the sliding motion of the plunger 62 is inclined upward relative to a mating surface P1 between the cylinder body 2 and the cylinder head 3. A distal end 62a of the plunger 62 is brought into contact against the abutment portion 53d of the tensioner lifter abutting-side half 51a of the cam chain tensioner 51 on the side of the cam chain tensioner 51 opposite to the cam chain 47.

As shown in FIG. 1, the internal combustion engine E is provided with the driving-sprocket cam chain guide 70, which slidingly guides the moving cam chain 47 around the driving sprocket 45 mounted to the crankshaft 20 and prevents dropout of the cam chain 47. The driving-sprocket cam chain guide 70 is formed of a resin in a J-shaped configuration such as to guide a lower end portion 47a of the cam chain 47 below the same. Since the driving-sprocket cam chain guide 70 guides the lower end portion 47a of the cam chain 47 below the same, the cam chain 47 is prevented from falling in the lower part of the internal combustion engine E even if the cam chain 47 disengages from the driven sprocket 46 during inspection work or the like.

Figure 8:
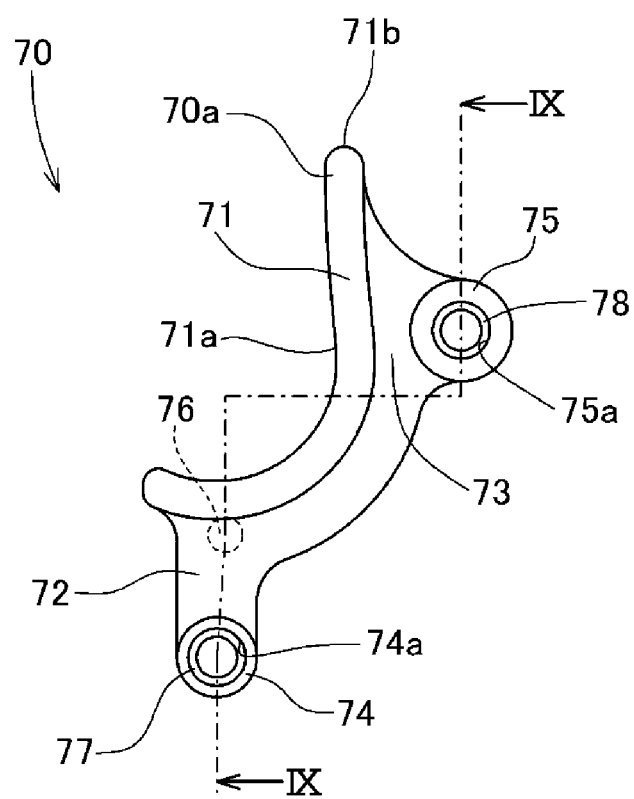
FIG. 8 is a front view of a drive-sprocket cam chain guide as viewed in a crankshaft axial direction.
Figure 9:
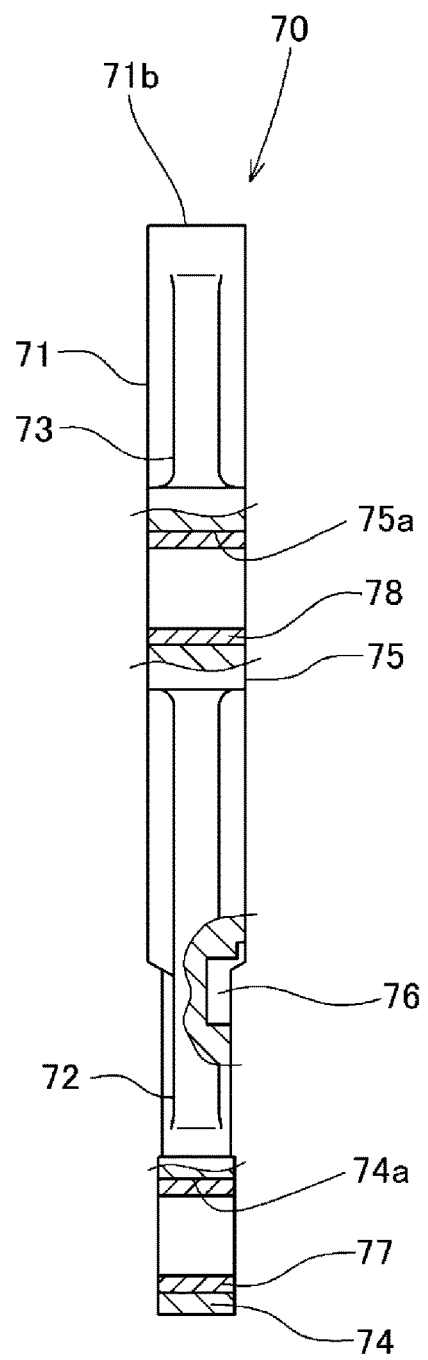
FIG. 9 is a view taken along the arrowed line IX in FIG. 8.
Figure 10:
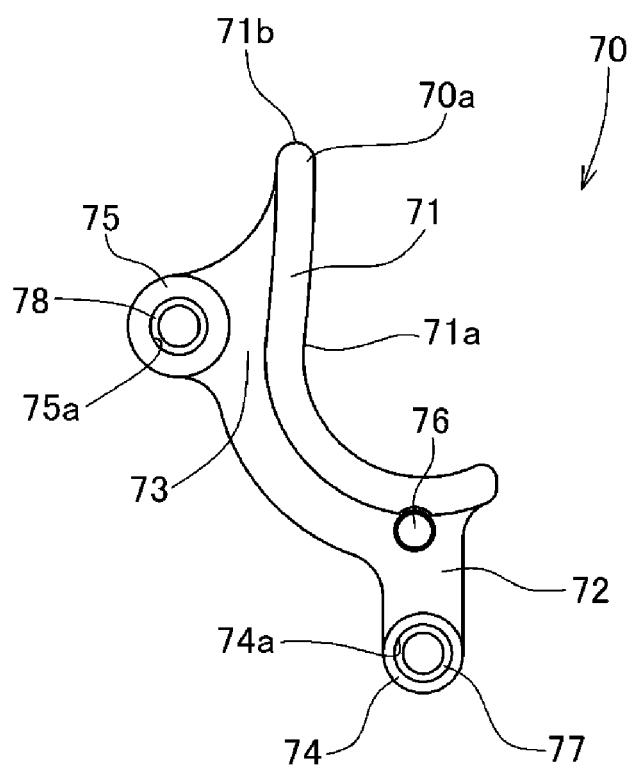
FIG. 10 is a view of the drive-sprocket cam chain guide of FIG. 8 as viewed from the rear side.

As shown in FIGS. 8 to 10, the driving-sprocket cam chain guide 70 includes a J-shaped guide body 71 for guiding the cam chain 47 along the driving sprocket 45. As depicted in FIG. 1, the guide 71 has an end part 71b on a side to deliver the cam chain 47. This end part 71b extends beyond a winding termination point P of the cam chain 47 on the driving sprocket 45 to the vicinity of the chain moving surface 52a of the cam chain tensioner 51. A surface of the guide body 71 which faces the cam chain 47 defines a guide surface 71a for guiding the cam chain 47 in contact with the cam chain.

As shown in FIG. 1 as viewed in the axial direction of the crankshaft 20, the driving-sprocket cam chain guide 70 includes an overhang portion 70a. Assume here a line L2, which is parallel to a line L1 connecting a rotational center C1 of the driving sprocket 45 and a rotational center C2 of the driven sprocket 46 and which is tangent to the winding termination point P of the cam chain 47 on the driving sprocket 45. The overhang portion 70a is formed to extend to the end part 71b in a direction making an overhang angle to the line L2 toward the line L1. In other words, the overhang portion 70a extends in a direction to deflect the cam chain 47 leaving the driving sprocket 45 inwardly of the tangent line L2. The overhang portion 70a guides the cam chain 47 in a direction to deflect it inwardly of the tangent line L2, and serves to provide smooth connection between the guide surface 71a of the driving-sprocket cam chain guide 70 and the chain moving surface 52a of the cam chain tensioner 51. Further, the overhang portion 70a permits the cam chain tensioner 51 to be decreased in convex curvature from the cam-chain tensioner support portion 1b. Thus, the load on the cam chain tensioner 51 can be reduced.

The driving-sprocket cam chain guide 70 includes: an extension 72 provided to extend away from the guide body 71 and away from the path of the cam chain 47 downwardly from the rotational center of the driving sprocket 45; and an extension 73 extending rearward from the rotational center C1 of the driving sprocket 45. The extensions 72 and 73 include fixing portions 74 and 75 to be fixed to the crankcase 1. The fixing portions 74 and 75 are respectively formed with collar insertion holes 74a and 75a in which collars 77 and 78 of iron, for example, are fitted.

The driving-sprocket cam chain guide 70 is formed with a hook hole 76 in its side facing the crankcase 1. The hook hole is formed between the guide body 71 and the extension 72 so as to position the driving-sprocket cam chain guide 70 to be mounted to the crankcase 1 by engaging an unillustrated projection formed on the crankcase 1 in the hook hole 76.

As FIG. 1 shows, the crankcase 1 is formed with driving-sprocket cam chain guide fixing portions 1c and 1d which are independent from the cam-chain tensioner support portion 1b and intended to fix the driving-sprocket cam chain guide 70 at predetermined positions. The driving-sprocket cam chain guide fixing portion 1c is located on a lateral side of the driving sprocket 45 and below the cam-chain tensioner support portion 1b with respect to the moving direction of the cam chain 47. The cam-chain tensioner support portion 1b is located nearer to the camshaft 41 than the camshaft side end 45a of the driving sprocket 45. The other driving-sprocket cam chain guide fixing portion 1d is located at a position under the rotational center C1 of the driving sprocket 45.

The driving-sprocket cam chain guide 70 is positioned and secured in place by having the hook hole 76 engaged with the projection of the crankcase 1, and is mounted to the crankcase 1 by inserting bolts 57 and 58 into the collar 77 of the fixing portion 74 and the collar 78 of the fixing portion 75, respectively, followed by screw-engaging the bolts with the driving-sprocket cam chain guide fixing portions 1c and 1d of the crankcase 1.

The internal combustion engine E has the above-described arrangement and offers the following effects.

The internal combustion engine E includes: the driving sprocket 45 integrally rotated with the crankshaft 20; the driven sprocket 46 integrally rotated with the intake camshaft 41 for driving the valve train 40; the cam chain 47 wound between the driving sprocket 45 and the driven sprocket 46 for transmitting power of the crankshaft 20 to the intake camshaft 41; the cam chain tensioner 51 for pressing the cam chain 47 at a position between the driving sprocket 45 and the driven sprocket 46; the tensioner lifter 60 for pressing the cam chain tensioner 51 with a predetermined pressure; and the driving-sprocket cam chain guide 70 for guiding the cam chain 47 along the driving sprocket 45. Further, as viewed in the crankshaft axial direction, the guide body 71 of the driving-sprocket cam chain guide 70 extends beyond the winding termination point P of the cam chain 47 on the driving sprocket 45 to the vicinity of the chain moving surface 52a on which the cam chain 47 of the cam chain tensioner 51 slides. Therefore, a function of the cam-chain dropout preventing member and a function of the cam chain guide controlling the behavior of the cam chain are both given to the driving-sprocket cam chain guide 70. Thus, the driving-sprocket cam chain guide 70 is adapted to control the behaviors such as vibrations of the cam chain 47 by preventing outward deflection of the cam chain 47. Further, durability of the tensioner lifter 60 is improved by reducing the load on the cam chain tensioner 51 for restraining the cam chain 47.

The crankcase 1 of the internal combustion engine E includes the cam-chain tensioner support portion 1b for swingably supporting the cam chain tensioner 51. The crankcase further includes the driving-sprocket cam chain guide fixing portions 1c, 1d which are independent from the cam-chain tensioner support portion 1b and intended for fixing the driving-sprocket cam chain guide 70 to place.

Since the cam-chain tensioner support portion 1b is located closer to the intake camshaft 41 from the camshaft side end 45a of the driving sprocket 45, the cam chain tensioner 51 can be reduced in size by reducing the length thereof along the cam chain 47. Thus, the load on the tensioner lifter 60 is further reduced so that the tensioner lifter is further improved in durability.

The driving-sprocket cam chain guide fixing portion 1c is provided adjacent to the cam-chain tensioner support portion 1b in the moving direction of the cam chain 47. Therefore, the driving-sprocket cam chain guide 70 and the cam chain tensioner 51 can be separately assembled, leading to the improvement in assemblability. This arrangement also permits these components to be separately disassembled for maintenance, making these components more maintainable. Further, the driving-sprocket cam chain guide fixing portions 1c, 1d and the cam-chain tensioner support portion 1b are separately mounted to the crankcase 1 and hence, the load applied to the case from the cam chain 47 is dispersed. The loads on or the strains of the driving-sprocket cam chain guide fixing portions 1c, 1d and the cam-chain tensioner support portion 1b can be reduced, respectively.

The driving-sprocket cam chain guide 70 is made of a synthetic resin while the guide 71 is formed in the J-shaped configuration to guide the lower end 47a of the cam chain 47 from below. Therefore, the driving-sprocket cam chain guide 70 has its guide surface 71a elongated in the J-shaped configuration and can achieve good moldability and reduction of sliding resistance and friction.

The driving-sprocket cam chain guide 70 includes the protrusion 70a as viewed in the axial direction of the crankshaft 20. The protrusion 70a is parallel to the line L1 passing through the rotational center C1 of the driving sprocket 45 and the rotational center C2 of the driven sprocket 46, the protrusion 70a deflects the cam chain 47 inward of the external tangent L2 of the cam chain 47, and external tangent L2 passes through the winding termination point P. Hence, the guide surface 71a of the driving-sprocket cam chain guide 70 and the chain moving surface 52a of the cam chain tensioner 51 are smoothly connected while the cam chain tensioner 51 can be decreased in curvature from the cam-chain tensioner support portion 1b. Thus, the load on the cam chain tensioner 51 can be reduced.

The tensioner lifter 60 is disposed at and mounted to the cylinder head 3. Hence, the cam chain tensioner 51 fixed at position can be elongated toward the intake camshaft 41 by the shortened amount of the lower part of the cam chain tensioner 51. At the same time, the increase in the load on the tensioner lifter 60 can be avoided.

The plunger 62, as the pressing member of the tensioner lifter 60 for pressing the cam chain tensioner 51, has the axis Lt of the sliding motion inclined upward relative to the mating surface P1 between the cylinder body 2 and the cylinder head 3. This permits the cam chain tensioner 51 to be positioned closer to the crankcase 1, thus obviating the size increase of the internal combustion engine E.

In the longitudinal direction of the cam chain tensioner 51, the tensioner lifter abutting-side half 51a thereof pressed by the plunger 62 is increased in thickness and weight, or made larger than the fixture-side half 51b thereof on the fixture-53b side. The centroid of the cam chain tensioner 51 is shifted toward the pressed portion 53d receiving the pressure from the tensioner lifter 60, so that the behaviors of the cam chain tensioner 51 can be stabilized.

While the embodiment of the invention has been described in detail, it is noted that the invention is not limited to the above-described embodiment and a variety of changes or modifications may be made thereto. The internal combustion engine E of the invention is not limited to the motorcycles but is widely applicable to other types of saddle riding vehicles.

REFERENCE SIGNS LIST

E . . . Internal combustion engine
P . . . Winding-termination point
P1 . . . Mating surface
C1 . . . Rotational center
C2 . . . Rotational center
L1 . . . Line
L2 . . . Tangent line
1 . . . Crankcase
1b . . . Cam-chain tensioner support portion
1c . . . Driving-sprocket cam chain guide fixing portion
2 . . . Cylinder body
3 . . . Cylinder head
4 . . . Cylinder head cover
20 . . . Crankshaft
40 . . . Valve train
41 . . . Camshaft
45 . . . Driving sprocket
45a . . . Camshaft-side end
46 . . . Driven sprocket
47 . . . Cam chain
47a . . . Lower end
50 . . . Cam chain tensioner mechanism
51 . . . Cam chain tensioner
51a . . . Tensioner lifter abutting-side half
51b . . . Fixing portion-side half
52a . . . *Chain moving surface*
60 . . . Tensioner lifter
62 . . . Plunger
70 . . . Driving-sprocket cam chain guide
70a . . . *Overhang portion*
71 . . . Guide body

The invention claimed is:

1. An internal combustion engine comprising:
a driving sprocket (45) integrally rotatable with a crankshaft (20);
a driven sprocket (46) integrally rotatable with a camshaft (41) driving a valve train (40);
a cam chain (47) wound between the driving sprocket (45) and the driven sprocket (46) and transferring power of the crankshaft (20) to the camshaft (41);
a cam chain tensioner (51) for pressing the cam chain (47) at a position between the driving sprocket (45) and the driven sprocket (46);
a tensioner lifter (60) for pressing the cam chain tensioner (51) with a predetermined pressure; and
a driving-sprocket cam chain guide (70) for guiding the cam chain (47) along the driving sprocket (45);
wherein, as viewed in a crankshaft axial direction, the driving-sprocket cam chain guide (70) includes a guide body (71) extending beyond a winding termination point (P) of the cam chain (47) on the driving sprocket (45) to a position adjoining a chain moving surface (52a) of the cam chain tensioner (51), on which the cam chain (47) slides.

2. The internal combustion engine according to claim 1, wherein the internal combustion engine (E) includes a crankcase (1) for bearing the crankshaft (20),
the crankcase (1) includes a cam-chain tensioner support portion (1b) for swingably supporting the cam chain tensioner (51),
the crankcase (1) includes a driving-sprocket cam chain guide fixing portion (1c), which is independent from the cam-chain tensioner support portion (1b) and fixes the driving-sprocket cam chain guide (70), and
the cam-chain tensioner support portion (1b) is located nearer to the camshaft (41) than a camshaft side end (45a) of the driving sprocket (45).

3. The internal combustion engine according to claim 2, wherein the driving-sprocket cam chain guide fixing portion (1c) is located adjacent to the cam-chain tensioner support portion (1b) in a moving direction of the cam chain (47).

4. The internal combustion engine according to claim 3, wherein the driving-sprocket cam chain guide (70) is made of a synthetic resin while the guide body (71) has a J-shaped configuration to guide at least a lower end (47a) of the cam chain (47) from below.

5. The internal combustion engine according to claim 4, wherein the driving-sprocket cam chain guide (70) includes an overhang portion (70a) which, as viewed in the axial direction of the crankshaft (20), extends to an end part (71b) thereof in a direction making an overhang angle to a line (L2), which is Parallel to a line (L1) connecting a rotational center (C1) of the driving sprocket (45) and a rotational center (C2) of the driven sprocket (46) and which is tangent to the winding termination point (P) of the cam chain (47) on the driving sprocket (45), in such a manner that the cam chain (47) is caused to be directed inward.

6. The internal combustion engine according to claim 5, wherein
the internal combustion engine includes a cylinder body (2) and a cylinder head (3) which are sequentially stacked on the crankcase (1), and
the tensioner lifter (60) is disposed on the cylinder head (3).

7. The internal combustion engine according to claim 6, wherein the tensioner lifter (60) includes a pressing member (62) for pressing the cam chain tensioner (51), the pressing member (62) having an axis (Lt) of sliding direction, the axis (Lt) being inclined upward relative to a mating surface (P1) between the cylinder body (2) and the cylinder head (3).

8. The internal combustion engine according to claim 7, wherein the cam chain tensioner (51) has a tensioner-lifter-abutting-side half (51a) pressed by the pressing member (62), and a fixing-portion-side half (51b), the tensioner-lifter-abutting-side half (51a) being larger than the fixing-portion-side half (51b).

* * * * *